(12) United States Patent
Song et al.

(10) Patent No.: US 8,287,657 B2
(45) Date of Patent: *Oct. 16, 2012

(54) HYDROPHOBICALLY MODIFIED CATIONIC POLYMERS AND THEIR USE AS CLEANING AIDS

(75) Inventors: Zhiqiang Song, Newtown, CT (US); Bingham Scott Jaynes, New City, NY (US); Jianwen Mao, New Milford, CT (US); Andrea Preuss, Basel (CH)

(73) Assignee: BASF SE, Ludwigshafen (DE)

( * ) Notice: Subject to any disclaimer, the term of this patent is extended or adjusted under 35 U.S.C. 154(b) by 543 days.

This patent is subject to a terminal disclaimer.

(21) Appl. No.: 11/792,031

(22) PCT Filed: Nov. 28, 2005

(86) PCT No.: PCT/EP2005/056256
§ 371 (c)(1), (2), (4) Date: Apr. 14, 2008

(87) PCT Pub. No.: WO2006/061334
PCT Pub. Date: Jun. 15, 2006

(65) Prior Publication Data
US 2009/0117071 A1 May 7, 2009

Related U.S. Application Data

(60) Provisional application No. 60/635,195, filed on Dec. 7, 2004, provisional application No. 60/685,235, filed on May 26, 2005.

(51) Int. Cl.
*B08B 3/04* (2006.01)
*C11D 3/37* (2006.01)
*C11D 1/00* (2006.01)

(52) U.S. Cl. .......... 134/25.2; 134/25.3; 134/39; 134/42; 510/199; 510/230; 510/238; 510/240; 510/434; 510/475; 510/504

(58) Field of Classification Search ............... 510/199, 510/230, 238, 240, 434, 475, 504; 134/25.2, 134/25.3, 39, 42
See application file for complete search history.

(56) References Cited

U.S. PATENT DOCUMENTS

| | | | | |
|---|---|---|---|---|
| 2,923,701 A | * | 2/1960 | Schuller et al. | 526/291 |
| 4,305,860 A | * | 12/1981 | Iovine et al. | 162/164.5 |
| 4,753,999 A | * | 6/1988 | Keil et al. | 525/328.3 |
| 4,835,234 A | | 5/1989 | Valint et al. | 526/258 |
| 6,326,343 B1 | | 12/2001 | Ghatlia et al. | |
| 7,501,387 B2 | | 3/2009 | Aihara et al. | |

FOREIGN PATENT DOCUMENTS

| | | | |
|---|---|---|---|
| WO | WO 03/070866 | * | 8/2003 |
| WO | WO 2004/056888 | * | 8/2004 |

* cited by examiner

*Primary Examiner* — Brian P Mruk
(74) *Attorney, Agent, or Firm* — Shiela A. Loggins

(57) ABSTRACT

A cleaning composition for hard surfaces containing a polymeric compound comprising a main backbone derived from at least the following monomeric components: (I) 20 to 99.9% by weight of at least one cationic monomer according to formula (I) wherein $R_1$ and $R_2$ are, independently of one another, hydrogen or $C_1$-$C_4$ alkyl; $R_3$ and $R_4$ are, independently of one another, hydrogen or alkyl, hydroxyalkyl, carboxyl alkyl, carboxyamide alkyl or alkoxyalkyl having from 1 to 18 carbon atoms; and Y represents an anion, and (II) 0.1 to 80% by weight of a hydrophobic unsaturated nonionic monomer that polymerizes in the presence of an initiator; optionally up to 60% by weight of a water-soluble monomer (III) which is different from either monomer (I) or monomer (II); and optionally reactant (IV), a crosslinking agent in an amount between 0 to 10% by weight, gives improved soil removal properties, antimicrobial and biofilm suppression properties as well as resistance to resoiling and staining.

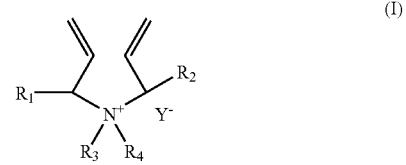

(I)

17 Claims, No Drawings

HYDROPHOBICALLY MODIFIED CATIONIC POLYMERS AND THEIR USE AS CLEANING AIDS

This application is a 371 of international app. No. PCT/EP2005/056256, filed Nov. 28, 2005, which claims priority to U.S. Provisional Application No. 60/685,235, filed on May 26, 2005 and U.S. Provisional Application No. 60/635,195, filed on Dec. 7, 2004, the contents of which are hereby incorporated by reference.

The present invention relates to the preparation of hydrophobically modified polymers that contain cationic groups, particularly those derived from diallyl dimethyl ammonium chloride (DADMAC) and similar moieties, and methods of use of such polymers in hard surface cleaning formulations that give improved soil removal properties, resistance to subsequent soiling and staining, and inhibition of bacterial growth on surfaces treated with said polymers.

There is a strong consumer need for cleaning products that are effective at removing difficult soils from hard surfaces in the home. These soils may include soap scum, hard water stains, rust, greasy soils, mud, kitchen soils and toilet stains, among many others.

In addition, there is a strong need for products that provide antimicrobial benefit, that is substances that exhibit a pronounced antimicrobial action, especially against pathogenic gram-positive and gram-negative bacteria and also against yeasts and molds. Such antimicrobials can be used, to render a surface material antibacterial or to disinfect hard surfaces prior to use.

It is important that antimicrobial products used in consumer products be toxicologically acceptable and not cause irritation and sensitization to the skin. They also need to be environmentally friendly and to biodegrade easily after use. There is also an increasing awareness that the antimicrobials used in killing or controlling microbial growth should not induce resistance of the microbes to antibiotics.

One approach to generate more effective cleaners has been to incorporate a polymer into the product that can modify the surface of the substrate during the cleaning process by adsorbing to the surface. Soil that is subsequently deposited onto the modified surface is easier to remove because of the modified properties of the surface. The actual mechanism for enhanced soil removal is generally believed to result from either: 1) reduced soil adhesion because of the modified surface properties; 2) a sacrificial film type mechanism where the soil is washed away with the film; or 3) increased water absorption on the surface which keeps soils from drying and makes them easier to remove. Other mechanisms may also be present.

European patent application 467,472 A2 discloses the use of quaternized ammonium alkyl methacrylate polymers and co-polymers thereof to modify hard surfaces to give easier cleaning benefits. U.S. Pat. No. 6,025,314 describes a dishwashing rinse aid composition comprising an ammonium alkyl acrylamide polymer or co-polymer that delivers improved proteinaceous soil-removing properties.

U.S. Pat. No. 6,664,218 discloses a hard surface cleaning composition containing a zwitterionic surfactant and a diallyl dimethyl ammonium chloride/acrylamide/acrylic acid co-polymer.

US patent application publication 2003/0203825 describes a method of reducing or preventing soil redeposition in an automatic dishwasher using a cleaning or rinsing composition also containing diallyl dimethyl ammonium chloride/acrylamide/acrylic acid co-polymers.

WO 03/070866 claims an antifouling detergent for hard surfaces comprising a polymer with monomer units consisting of various cationic materials, preferably diallyl dimethyl ammonium chloride. US patent application publication 2003/0216281 describes a liquid cleaning composition for hard surfaces that comprises a co-polymer having both a cationic monomer and either an anionic or uncharged hydrophilic group.

WO 04/056888 describes the synthesis of co-polymers of diallyl dimethyl ammonium chloride with hydrophobic co-monomers and their use as laundry additives to prevent dye bleeding and/or dye transfer from fabrics. There is speculation that said co-polymers might also find use in formulations that are used to treat hard surfaces at home or otherwise indoors to prevent staining, for example dishes in dishwashing applications, but this is not exemplified.

None of these publications describes the use of a co-polymer of diallyl dimethyl ammonium with hydrophobic co-monomers for use in hard surface cleaning applications as described herein. However it has been found that such materials have a unique ability to bind to and modify hard surfaces because of their combination of cationic charge and hydrophobic properties. These properties provide unique soil removal properties to cleaning formulations when incorporated therein.

One object of the invention is to provide hard surface cleaning formulations containing hydrophobically modified polymers that contain cationic groups, particularly DADMAC moieties. Another objective is to provide methods of use of such polymers in hard surface cleaning formulations that give improved soil removal properties as well as resistance to soiling and staining. Examples of such surfaces include ceramic tile, stone, glass, cement, concrete, bricks, plaster (e.g. walls), marble and masonry; countertops of stone, marble or plastic, and wood, laminates or other types of floors made of organic or inorganic materials.

Polymers having both hydrophobic and cationic groups are believed to be able to enhance the substantivity of the polymer to the substrates thereby improving the surface modification performance and subsequent soil removal performance. At the same time, these polymers possess reasonable water solubility/dispersibility so that they can be readily incorporated into liquid hard surface cleaning formulations.

Another object of this invention is to provide cleaning products or substances that could help prevent the growth and multiplication of microorganisms and/or the formation of biofilms, the latter often resulting from the accumulation of large quantity of microorganisms that can not be controlled by the use of common antimicrobial substances, on substrates of interest to human beings. It can be envisioned that such bio-resistant films could be polymeric materials, such that the polymeric substances could provide the desirable antimicrobial properties to the substrates by creating a microbe-resistant film on the substrate. The mode of action of such an effect could be the result of creating a surface that is hostile to the attachment, adhesion, growth, accumulation and proliferation of microorganisms of interest, rather than the conventionally described inhibition, killing, elimination, i.e. bacteristatic or bactericide effects as afforded by conventional antimicrobial substances. The polymeric film could also possess minimal risk in terms of bio-penetration to biological substrates such as skin, nail, and hair, and also in terms of eco-toxicity to the environment, which is often a result of undesirable antimicrobial efficacy of the subject substances against microorganisms found in an aquatic environment.

Furthermore, it can be envisioned that such polymeric substances could be superior in terms of their limited release of any harmful substance.

Therefore such substances, herein described as weak antimicrobial microorganism-controlling agents, would be of significant interest to many applications as well as to the provision of environmentally friendly solutions.

The present invention is directed toward a hard surface protectant and cleaning composition, which contains polymeric compounds comprising a main backbone derived from at least the following monomeric components:

(I) 20 to 99.9% by weight, preferably 50% to 99% by weight, of at least one cationic monomer according to formula (I)

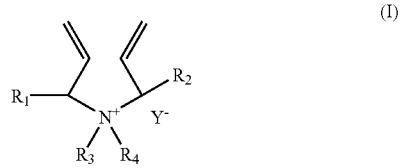

wherein
$R_1$ and $R_2$ are, independently of one another, hydrogen or $C_1$-$C_4$ alkyl;
$R_3$ and $R_4$ are, independently of one another, hydrogen or alkyl, hydroxyalkyl, carboxyl alkyl, carboxyamide alkyl or alkoxyalkyl having from 1 to 18 carbon atoms; and
$Y^-$ represents an anion, and (II) 0.1 to 80% by weight of a hydrophobic unsaturated non-ionic monomer that polymerizes in the presence of an initiator;
optionally up to 60% by weight of a water-soluble monomer (III) which is different from either monomer (I) or monomer (II); and
optionally reactant (IV), a crosslinking agent in an amount between 0 to 10% by weight.

The present invention is also directed toward a method of hard surface cleaning and protection from subsequent soiling or bacterial contamination, which comprises contacting a surface with an effective cleaning amount of a hard surface cleaning formulation containing a polymeric compound according to formula (I) as defined above.

Polymers useful in the present invention having both hydrophobic and cationic groups can be produced, in the presence of an activator, from a polymerization mixture comprising (I) 20 to 99.9%, preferably 50 to 99%, and especially 80 to 96% by weight, of at least one cationic monomer according to formula (I)

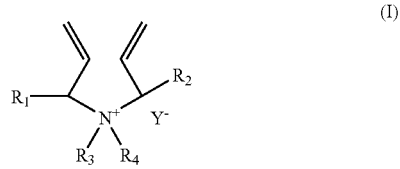

where
$R_1$ and $R_2$ are, independently of one another, hydrogen or $C_1$-$C_4$ alkyl;
$R_3$ and $R_4$ are, independently of one another, hydrogen, alkyl, hydroxyalkyl, carboxyl alkyl, carboxyamide alkyl or alkoxyalkyl groups having from 1 to 18 carbon atoms; and
$Y^-$ represents an anion,
(II) 0.1 to 80%, preferably 1 to 50%, and especially 4 to 20% by weight, of a hydrophobic unsaturated nonionic monomer that polymerizes in the presence of the initiator,
optionally up to 60% by weight, preferably up to 20% by weight, of a water-soluble monomer (III) which is different from either monomer (I) or monomer (II); and
optionally reactant (IV), a crosslinking agent in an amount between 0 to 10%, preferably 0 to 2% by weight. Certain such compounds are known from WO 2004/056888 A2.

The hydrophobic monomer (II) has a value for water solubility of preferably less than about 50 g/100 g water, and more preferably, less than 5 g/100 g water at room temperature and at a pH of 7.

Examples of the preferred cationic monomers (I) include diallyidimethyl ammonium chloride (DADMAC), diallyi-dimethyl ammonium bromide, diallyidimethyl ammonium sulfate, diallyidimethyl ammonium phosphates, dimethallyi-dimethyl ammonium chloride, diethylallyl dimethyl ammonium chloride, diallyl di(beta-hydroxyethyl) ammonium chloride, and diallyl di(beta-ethoxyethyl) ammonium chloride. The most preferred cationic monomer is DADMAC. Preferably the polymerization mixture comprises 50% to 99% by weight, especially 80 to 98% by weight, of at least one cationic monomer according to formula (I).

Examples of the hydrophobic monomer (II) include, without limitation, selected vinyl and (meth)acrylate based compounds, and other unsaturated compounds such as (meth)acrylonitrile and esters of unsaturated polyfunctional acids.

Examples of suitable vinyl compounds for monomer (II) include, but are not limited to, styrene; vinyl esters of $C_2$ to $C_{18}$ carboxylic acids, such as vinyl acetate and vinyl butyrate; N-vinyl amides of $C_2$ to $C_{18}$ carboxylic acids, such as N-vinyl acetamide, and the like.

The (meth)acrylic based compounds suitable as monomer (II) include, but are not limited to, esters of (meth)acrylic acid and amides of (meth)acrylic acid.

Esters of (meth)acrylic acid or (meth)acrylates encompass: long- and short-chain alkyl(meth)acrylates such as methyl (meth)acrylate, ethyl(meth)acrylate, propyl(meth)acrylate, isopropyl(meth)acrylate, butyl(meth)acrylate, amyl(meth) acrylate, isobutyl(meth)acrylate, t-butyl(meth)acrylate, pentyl(meth)acrylate, isoamyl(meth)acrylate, hexyl(meth)acrylate, heptyl(meth)acrylate, octyl(meth)acrylate, isooctyl (meth)acrylate, 2-ethylhexyl(meth)acrylate, nonyl(meth)acrylate, decyl(meth)acrylate, isodecyl(meth)acrylate, undecyl(meth)acrylate, dodecyl(meth)acrylate, lauryl(meth) acrylate, octadecyl(meth)acrylate, and stearyl(meth)acrylate; alkoxyalkyl(meth)acrylates, particularly $C_1$-$C_4$alkoxy $C_1$-$C_4$alkyl(meth)acrylates, such as butoxyethyl acrylate and ethoxyethoxyethyl acrylate;
aryloxyalkyl(meth)acrylates, particularly aryloxy $C_1$-$C_4$alkyl(meth)acrylates, such as phenoxyethyl acrylate (e.g., Ageflex®, Ciba Specialty Chemicals Corp.);
mono- and polycyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., Ageflex® IBOA, Ciba Specialty Chemicals Corp.), tetrahydrofurfuryl acrylate (e.g., SR285, Sartomer Company, Inc.), caprolactone acrylate (e.g. SR495, Sartomer Company, Inc.), and acryloylmorpholine;
alcohol-based (meth)acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4)nonylphenol acrylate (e.g., Photomer 4003, Henkel Corp.);
amides of (meth)acrylic acid such as diacetone acrylamide, isobutoxymethyl acrylamide, and t-octyl acrylamide; and
esters of polyfunctional unsaturated acids, such as maleic acid esters and fumaric acid esters.

With respect to the long and short chain alkyl acrylates listed above, a short chain alkyl acrylate is an alkyl group with 6 or less carbons and a long chain alkyl acrylate is alkyl group with 7 or more carbons. Most suitable monomers are either commercially available or readily synthesized using reaction schemes known in the art. For example, most of the above-listed monomers can be synthesized by reacting an appropriate alcohol or amide with an acrylic acid or acryloyl chloride.

Specific examples of preferred compounds for use as monomer (II) are exemplified by formula (B)

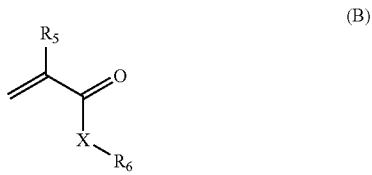

wherein
$R_5$ is H or $CH_3$,
$R_6$ is $C_1$-$C_{12}$alkyl, $C_1$-$C_{12}$alkoxy, $C_1$-$C_6$alkylphenyl that may be substituted one to three times by $C_1$-$C_{12}$alkyl or $C_1$-$C_{12}$alkoxy, $C_1$-$C_6$alkylphenyl interrupted one or more times by oxygen wherein the phenyl group may be substituted one to three times by $C_1$-$C_{12}$alkyl, $C_1$-$C_{12}$alkoxy or $C_1$-$C_6$alkylhydroxy;
X is a divalent radical selected from —O—, —NH— and —NR—, and
R is $C_1$-$C_6$alkyl.

Particularly preferred compounds are exemplified by:

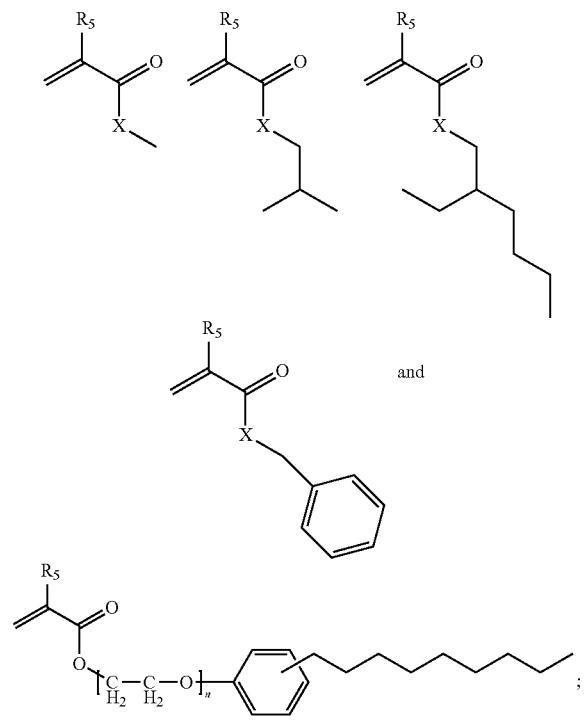

wherein $R_5$ and X are defined above and n is a number from 1 to 5, preferably 2 or 3.

The polymerization mixture optionally further includes a water-soluble monomer (III) that is a polymerizable monomer different from monomer (I) and monomer (II). Water-soluble monomer (III) has a value for water solubility preferably greater than 50 g/100 g water at room temperature and at a pH of 7.

Water-soluble monomer (III) can be nonionic, anionic or cationic. Examples of monomer (III) include vinyl amine, vinyl formamide, vinyl alcohol, vinylpyrrolidone, vinyl caprolactam, vinyl derivatives of dimethyl siloxane, aminosiloxane and other derivatives, various vinyl fluorocarbons, hydroxyalkyl acrylates such as 2-hydroxyethyl-acrylate, 2-hydroxypropyl-acrylate, and 2-hydroxybutyl-acrylate; aminoalkyl acrylates such as dimethylaminoethyl acrylate, diethylaminoethyl acrylate, and 7-amino-3,7-dimethyloctyl acrylate, and their salts including their alkyl and benzyl quaternized salts; (meth)acrylic acid and its salts; and acrylamide, methacrylamide, N,N-dimethyl acrylamide, N,N-diethyl acrylamide, N,N'-dimethylaminopropyl acrylamide, and their salts.

The polymerization mixture further optionally contains reactant (IV), which is a crosslinking agent, in an amount between 0 to 10% by weight. Preferred examples of suitable crosslinking agents include methylene bisacrylamide, pentaerythritol, di-, tri- and tetra-acrylate, divinylbenzene, polyethylene glycol diacrylate and bisphenol A diacrylate.

More generally, suitable crosslinking agents are polyfunctional ethylenically unsaturated monomers. Such include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. (West Chester, Pa.) and Photomer 4025 and Photomer 4028, available from Henkel Corp., Ambler, Pa., and propoxylated bisphenol A diacrylate with a degree of propoxylation being 2 or greater, preferably ranging from 2 to about 30;

trimethylolpropane polyacrylates with and without alkoxylation such as ethoxylated trimethylolpropane triacrylate with ethoxylation being 3 or greater, preferably ranging from 3 to about 30 (e.g., Photomer 4149, Henkel Corp., and SR499, Sartomer Company, Inc.), propoxylated trimethylolpropane triacrylate with propoxylation being 3 or greater, preferably ranging from 3 to 30 (e.g., Photomer 4072, Henkel Corp. and SR492, Sartomer), and ditrimethylolpropane tetraacrylate (e.g., Photomer 4355, Henkel Corp.);

alkoxylated glyceryl triacrylates such as propoxylated glyceryl triacrylate with propoxylation being 3 or greater (e.g., Photomer 4096, Henkel Corp. and SR9020, Sartomer);

pentaerythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Henkel Corp., and SR399, Sartomer Company, Inc.);

isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; polyol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; hydroxy acrylates formed by adding acrylate to bisphenol A diglycidylether and the like (e.g., Photomer 3016, Henkel Corp.); and single and multi-ring cyclic aromatic or non-aromatic polyacrylates such as dicyclopentadiene diacrylate and dicyclopentane diacrylate.

The preparation of the inventive polymers can be carried out using various polymerization techniques such as solution, emulsion, microemulsion, inverse emulsion, and/or bulk polymerizations, as well as other technologies that are known to those who are skilled in the art. The polymerization can obviously be carried out with or without various initiators of various concentrations. The co- or ter-polymers can also be prepared in such a way that the architecture of the polymers is random, block, alternating, core-shell, with or without the use of polymerization regulators such as nitroxyl ethers or other types of nitroxyl radicals.

The preferred method for making the inventive polymers is by aqueous polymerization using a water-soluble initiator. Examples of the suitable initiators include persulfates such as ammonium persulfate (APS); peroxides such as hydrogen peroxide, t-butyl hydroperoxide, and t-butyl peroxy pivalate, azo initiators such as 2,2'-azobis(2-amidinopropane) dihydrochloride, 4,4'-azobis-4-cyanovaleric acid and 2,2'-azobisisobutyronitrile; and redox initiator systems such as t-butyl hydroperoxide/Fe(II) and ammonium persulfate/bisulfite.

Aqueous solution polymerization using ammonium persulfate (APS) is the preferred method for preparing polymers having the preferred cationic DADMAC monomers. The amount of the free radical initiator used in the polymerization process depends on total monomer concentration and the type of monomers used and may range from about 0.2 to about 5.0% by weight of total monomer charge to achieve more than 99% of total monomer conversion.

Hydrophobic monomer (II) dissolves, at least in part, in the aqueous phase and copolymerizes with the preferred cationic monomer DADMAC to form a polymer having both cationic and hydrophobic groups. When hydrophobic monomer (II) is added to the polymerization system in an amount higher than its water solubility, the excess amount can form a second phase of fine droplets if adequate agitation is provided. Without intending to being bound to this polymerization mechanism, the droplets of monomer (II) may serve as a monomer reservoir to provide monomer (II) to the aqueous phase.

When a water-soluble initiator is used, copolymerization of monomer (I) and the dissolved portion of the hydrophobic monomer (II) is initiated in the aqueous phase. The hydrophobically modified polymer thus formed may or may not be soluble in water depending on its hydrophobicity or water solubility and the concentration of the monomer (II) used. The resulting polymer can possess surfactant properties and may occur in a colloidal state giving the appearance of translucence.

The required amount of monomer (II) may be added all at the beginning, in increments, or added by continuous feeding to the reactor. Continuous feeding of hydrophobic monomer (II) to the aqueous reaction medium may have the advantage of producing hydrophobically modified copolymers with less formation of homopolymers or large homopolymeric segments.

It is preferred to carry out the polymerization in the absence of oxygen. Oxygen can be removed from the reaction medium by applying vacuum with agitation or by purging with an inert gas such as nitrogen or argon. The polymerization can then be conducted under a blanket of the inert gas.

The molecular weight of the polymers being prepared can range from a thousand to millions. For example they have an average molecular weight in the range of 1000 to 5 million Daltons as measured by GPC.

The polymers can appear in various forms, i.e. solutions, dispersions, suspensions, granules, powders, beads, blocks, etc. In the case of liquid forms such as solutions, dispersions, suspensions, etc., the liquid phase can be aqueous and/or non-aqueous such as soybean oils, esters, and mineral oils.

The polymers used in the present invention may be incorporated into any type of cleaning formulation that is known to those skilled in the art. The polymer may be present in the cleaning formulation in an amount ranging from 0.01% to 20%, or preferably from 0.05% to 5% and more preferably from 0.1% to 2% by weight. The cleaning formulation may also contain water, surfactants, solvents, builders, thickeners, dyes, perfumes, salts, hydrotropes, biocides, fungicides and the like. The cleaning formulation may also contain other types of soil release polymers, colorants, preservatives, antimicrobials, optical brighteners, ultraviolet light absorbers, other light management agents, ionization agents, antifoam agents, enzymes, bleaching agents, oxidation catalysts, zeolites, and/or odor suppressing agents including but not limited to cyclodextrin and derivatives thereof, or mixtures thereof.

The surfactants used in the surface cleaner formulation are typically water-soluble or water dispersible. The surfactants are well known in the art.

Surfactants used in the present invention may be selected from one or more surfactants, which may be anionic, cationic, non-ionic, amphoteric or zwitterionic surface-active agents. Most preferred in this invention are the cationic and non-ionic surfactants, because the cationic nature of the polymer may be incompatible with certain anionic surfactants.

Non-ionic surfactants that may be used in the present invention include but are not limited to alkoxylated alcohols, including ethoxylated and propoxylated alcohols, as well as ethoxylated and propoxylated alkyl phenols. Other classes include sorbitan fatty esters and fatty acids of unsaturated alcohols.

Other classes of non-ionic surfactants include alkylpolysaccharides as disclosed in U.S. Pat. No. 4,565,647, which have a hydrophobic group containing from about 6 to 30 carbon atoms, preferably from about 10 to 16 carbon atoms as well as a polysaccharide, such as a polyglycoside, hydrophilic group.

Another class of suitable surfactants comprises certain mono-long chain-alkyl cationic surfactants for use in hard surface cleaning compositions according to the invention. Cationic surfactants of this type include quaternary ammonium salts of the general formula $R_{10}R_{20}R_{30}R_{40}N^+$ $X^-$ wherein the R groups are long or short hydrocarbon chains, typically alkyl, hydroxyalkyl or ethoxylated alkyl groups, and X is a counter-ion (for example, compounds in which $R_{10}$ is a $C_8$-$C_{22}$ alkyl group, preferably a $C_8$-$C_{10}$ or $C_{12}$-$C_{14}$ alkyl group, $R_{20}$ is a methyl group, and $R_{30}$ and $R_{40}$, which may be the same or different, are methyl or hydroxyethyl groups); and cationic esters (for example, choline esters). X is preferably a halide counter-ion, for example chloride or bromide.

The cleaning formulation may be applied as a ready-to-use spray, liquid or paste, directly on the surface, which is then wiped using a paper towel, sponge, cloth, mop or other suitable wiping implement. Alternatively the composition may be applied first to the wiping implement and then to the surface. The composition may also be supplied in a dilutable form that is a solid or liquid concentrate that may be diluted with water to arrive at the final cleaning composition. For example it may be in the form of a dilutable powdered or granular formulation, or a tablet, pouch or sachet.

The composition may be added to a wipe or pad, either reusable or disposable, which is then used to treat the surface by wiping. The composition is absorbed into or adsorbed onto the wipe or pad, that is to say, the wipe or pad is impregnated with the aqueous cleaning composition. Such a wipe may be constructed of natural or synthetic fibers, for example cellulosic, polyester, polyolefin, woven or non-woven fibers, or any other material or combination of materials suitable for making a wiping cloth as is known by those skilled in the art. Such wiping cloths typically are constructed out of non-woven type materials. Polyolefin is for example polypropylene or polypropylene copolymers or blends. Cellulosic means cellulose-based.

The composition containing the polymer in a cleaning formulation will typically give a pH of 3 to 12, preferably from 4 to 11.

The invention further relates to a method of hard surface cleaning, which comprises contacting a surface with an effective amount of a cleaning formulation according to the invention. Said methods of cleaning hard surfaces give improved soil removal properties as well as resistance to soiling, staining and bacterial contamination.

In one such method, the cleaning formulation according to the invention is sprayed onto a soiled hard surface. The wetted surface is then wiped clean using a paper towel or other suitable applicator tool. This initial cleaning process will cause the polymer of the invention to deposit onto the hard surface, forming an invisible film. After subsequent re-soiling of the surface, the soil will be more easily removed than in the case where the cleaning formulation according to invention was not used in the initial cleaning step. The surface may also remain cleaner longer than an untreated surface because the easier cleaning property conferred by the cleaning formulation according to invention will tend to prevent soil from adhering to the surface in general. Such a treated surface will also be resistant towards the growth of bacteria versus a similar surface that has not been treated with the polymer composition.

In an alternative method of application, the cleaning formulation of the invention can be applied to a clean surface as a pre-treatment step, causing the polymer to adhere to the surface as an invisible film. The surface will also be resistant to soiling and bacterial contamination, and will be easier to clean in subsequent steps, compared to a similar surface that was not treated with the cleaning composition of this invention. Thus the invention further relates to a method of treating a hard surface whereby resistance to soiling and ease of subsequent soil removal is improved, which comprises contacting said hard surface with an effective amount of a formulation according to the invention.

The following examples describe certain embodiments of this invention, but the invention is not limited thereto. It should be understood that numerous changes to the disclosed embodiments can be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated.

A full description of the biofilm inhibition and antiadhesion testing methods used below in examples 7 and 8 may be found in Bechert T. et al, Nature Medicine (2000), Vol. 6, No. 9, pages 1053-6.

EXAMPLE 1

A 1-liter reactor equipped with a condenser, a thermometer, a nitrogen inlet, and an overhead agitator is charged with 453.8 g of 66% monomer DADMAC, 15.8 g of methyl methacrylate (MMA), 57.4.0 g of deionized water and 0.15 g of 20% $Na_4EDTA$ solution. The polymerization mixture is purged with nitrogen and heated with agitation to a temperature of 90° C. An aqueous solution containing 5.1 g of ammonium persulfate (APS) is slowly fed to the reactor over 190 minutes. The reaction temperature is allowed to increase to above 100° C. and then maintained at reflux temperature (100 to 110° C.) during the APS feed period. After the APS feed, the reaction temperature is lowered down to and held at 95° C. for about 30 minutes. Then an aqueous solution containing 5.6 g of sodium metabisulfite (MBS) is added over 30 minutes. The reactor content is held at 95° C. for another 30 minutes to complete the polymerization (above 99% conversion). The polymer solution is diluted with sufficient water to about 35% solids and cooled to room temperature. Total monomer conversion is measured to be above 99.5%. The final product has a Brookfield viscosity of 23,400 cps at 25° C. (using a Brookfield LV4 spindle at 12 rpms) and 33.7% polymer solids.

EXAMPLE 2

A 1-liter reactor equipped with a condenser, a thermometer, a nitrogen inlet, and an overhead agitator is charged with 453.8 g of 66% monomer DADMAC, 15.8 g of ethoxylated nonylphenol acrylate (ENPA), 57.4.0 g of deionized water and 0.15 g of 20% $Na_4EDTA$ solution. The polymerization mixture is purged with nitrogen and heated with agitation to a temperature of 90° C. An aqueous solution containing 5.1 g of ammonium persulfate (APS) is slowly fed to the reactor over 190 minutes. The reaction temperature is allowed to increase to above 100° C. and then maintained at reflux temperature (100 to 110° C.) during the APS feed period. After the APS feed, the reaction temperature is lowered down to and held at 95° C. for about 30 minutes. Then an aqueous solution containing 5.6 g of sodium metabisulfite (MBS) is added over 30 minutes. The reactor content is held at 95° C. for another 30 minutes to complete the polymerization (above 99% conversion). The polymer solution is diluted with sufficient water to about 35% solids and cooled to room temperature. Total monomer conversion is measured to be above 99.5%. The final product has a Brookfield viscosity of 15,700 cps at 25° C. (using a Brookfield LV4 spindle at 12 rpms) and 33.7% polymer solids.

EXAMPLE 3

This example demonstrates addition of hydrophobic monomer II by continuous feeding. The polymerization procedure is the same as example 1 except that the amount of 15.8 g methyl methacrylate is fed to the reactor over about 45 minutes from when the APS initiator feed is started. The polymer solution is diluted with sufficient water to about 35% solids and cooled to room temperature. Total monomer conversion is measured to be above 99.5%. The final product has a Brookfield viscosity of 19,500 cps at 25° C. (using a Brookfield LV4 spindle at 12 rpms) and 35% polymer solids. The final polymer product is clear compared to the emulsion appearance of the product of Example 1.

All polymers tested below were made similarly to the preparation described in example 1 and 2 unless noted otherwise.

EXAMPLE 4

Application

For each of the polymers described in the table below, a solution of 0.5% of polymer (by weight) is prepared in deionized water. 2 mL of the polymer solution is added to a folded paper towel; then the treated towel is wiped across the face of one half of an 8 in×8 in ceramic tile, for a period of 30 seconds, resulting in complete wetting of that part of the ceramic tile surface. The other half of the tile is left untreated as a control. The ceramic tile is then rinsed under flowing deionized water for a period of 30 seconds; then allowed to air dry.

The entire tile is then soiled with a simulated soap scum soil, prepared by sequentially spraying two solutions onto the face of the tile using a Preval Sprayer. The first solution was 2.5% calcium chloride in deionized water, and the second is a solution containing 4% potassium oleate, 0.5% sodium stearate and 0.1% methylene blue in deionized water. After air-drying for 15 minutes, the sprayed tile is baked at 85° C. for 1 hour.

The soiled tile was then cleaned using a Gardner Washability and Wear Tester (Model D10V) fitted with two sponges that are wet with deionized water and squeezed dry until just damp. The tiles were cleaned in a side-by-side cleaning run until the soil is substantially removed from at least one side of the tile. The removal of soil is scored visually, measuring the percentage of soil remaining on both the control and polymer-treated side of the tile. The percentage remaining on the polymer-treated side is then subtracted from the percentage on the control side and the score is normalized to a scale of "0" to "+++++", where 0 represents no difference in soil removal between the control and treated side, and +++++ represents complete removal of soil from the treated side and no removal of soil from the control side.

The results for three polymers of this invention are shown in Table 1 below:

TABLE 1

| Polymer | Number of Gardner Strokes | Soil Removal Score |
|---|---|---|
| DADMAC/benzyl methacrylate (95/5) | 1 | ++++ |
| DADMAC/butyl methacrylate (95/5) | 2 | ++ |
| DADMAC/methyl methacrylate (95/5) | 2 | +++ |

EXAMPLE 5

Application

Solutions of 0.5% of each polymer are prepared in a typical hard surface cleaning formulation containing both nonionic and cationic surfactants, solvent and a chelator, as described in Table 2 below:

TABLE 2

| Component | Description | Amount (active level) |
|---|---|---|
| BTC 50 NF (Stepan) | Cationic surfactant | 0.2% |
| Tomadol 23-65 (Tomah) | Nonionic surfactant | 1.5% |
| Tomadol 91-8 (Tomah) | Nonionic surfactant | 1.5% |
| Propylene glycol methyl ether | Solvent | 2.0% |
| Ethylenediamine tetraacetic acid, tetrasodium salt | Chelator | 0.5% |
| Deionized water | — | To 100% |
| Soil release polymer | Soil Release Agent | 0.5% |
| Sodium hydroxide | Alkalinity | To pH 11 |

Ceramic tiles are treated on one half with the hard surface cleaning solution containing the soil release polymer in the same manner as described in Example 4, except that the control side is treated with the hard surface cleaning formulation without added polymer.

After soiling with simulated soap scum soil and cleaning as described in Example 4, the tiles are evaluated for soil removal. Table 3 below summarizes the results, which are run in triplicate for the three different polymers.

TABLE 3

| Polymer | Number of Gardner Strokes | Soil Removal Score |
|---|---|---|
| DADMAC/benzyl methacrylate (95/5) | 6 | +++ |
|  | 23 | +++ |
|  | 3 | +++ |
| DADMAC/butyl methacrylate (95/5) | 2 | +++ |
|  | 2 | ++ |
|  | 2 | + |
| [1]DADMAC/methyl methacrylate (95/5) | 2 | ++ |
|  | 2 | ++ |
|  | 44 | + |

[1]Prepared as in example 3.

EXAMPLE 6

Application

A ceramic tile is treated on one half with a solution of DADMAC/butyl methacrylate (95/5) polymer in the hard surface cleaning formulation as described in Example 5. The tile is then treated with 1.5 g of a simulated greasy particulate soil slurry prepared from 39.55 g corn oil, 2.5 g oleic acid, 0.04 g Oil Blue N, and 7.9 g kaolin clay by painting on with a brush. The soiled tile is then baked at 85° C. for approximately 24 hours until the blue soil turns to pink. After cooling, the tile is cleaned on the Gardner Washability Tester with sponges that are first wet with deionized water, then with 10 mL of cleaning formulation described in Example 5 without added polymer. The test is scored in the same manner as in Examples 4 and 5. (See table 4 below.)

TABLE 4

| Polymer | Number of Gardner Strokes | Soil Removal Score |
|---|---|---|
| DADMAC/butyl methacrylate (95/5) | 25 | ++ |
|  | 13 | +++ |

EXAMPLE 7

Biofilm Proliferation Inhibition of DADMAC Copolymers

DADMAC copolymers are provided as stock solutions in deionized water in the appropriate test concentration.
Test Principle:
Standard pins (small cylinders 2 mm×8-9 mm) made from polymethylmethacrylate (PMMA) are incubated in the DADMAC copolymer stock solutions for 20 minutes and dried. The coated pins are contacted with a suspension of the test organism to let the test organisms adhere to the surface of the pin. The pins are then transferred to a growth medium to enable release of daughter cells into the growth medium. The pins are then removed after an appropriate incubation time. Growth of the daughter cells is followed by monitoring the optical density of the growth medium with a microplate reader with a normal photometric unit at 578 nm.

| Test organism: | *Staphylococcus epidermidis* |
|---|---|
| Test concentration: | 0.5% (wt. % of polymer) |
| Coating time: | 20 min. |
| Drying time: | 30 min. |
| Contact time (cells): | 1 hr. |
| Release of daughter cells: | 24 hr. |
| Incubation time: | 48 hr. |

Table 5 gives results for the biofilm proliferation inhibition test.

Results are expressed in the number of hours for which growth of the biofilm organisms is suppressed. A result of 48 hrs. indicates that biofilm proliferation is completely suppressed for 48 hours.

TABLE 5

| Polymer | Growth reduction [hrs] |
|---|---|
| DADMAC/methyl methacrylate (95/5) | 48 |
| Ethanol reference | 1.0 |

EXAMPLE 8

Inhibition of primary adhesion and attachment of microorganism cells by DADMAC copolymers is shown below.

Test Principle:

Standard pins made from PMMA are incubated in stock solutions of the copolymers for 20 minutes and dried. The coated pins are contacted with a suspension of the test organism to let the test organisms adhere to the surface of the pins for 1 hr. After washing and transfer to a blocking solution, the pins are treated with an *S. epidermidis* antibody over night and, after a further washing step, with a $2^{nd}$ antibody with an enzyme attached to it (alkaline phosphatase) for 1 hr. After the last washing step, the pins are transferred to an enzyme substrate solution and the color change is observed with a microplate reader at 405 nm.

| Test organism: | *Staphylococcus epidermidis* |
|---|---|
| Test concentration: | 0.5% (wt. % of polymer) in the stock solution |
| Coating time: | 20 min. |
| Drying time: | 15 min. |
| Contact time cells: | 1 hr. |
| Contact time $1^{st}$ antibody: | 24 hr. |
| Contact time $2^{nd}$ antibody: | 1 hr. |

Table 6 shows the results of the adhesion test carried out in example 8.

The results are given in % attachment of cells as compared to the untreated pins. The copolymer solution shows significant reduction in bacterial adhesion.

TABLE 6

| Polymer | Adhesion [%] |
|---|---|
| DADMAC/Methyl methacrylate (95/5) | 17 |
| without coating | 100 |

EXAMPLE 9

Determination of Microbicidal Activity of Different DADMAC Copolymers

Test Principle:

1 g stock solution with an appropriate concentration of test products are mixed with 8 g water and then inoculated with 1 ml of the selected test organisms. After a given contact period, aliquots are taken, inactivated and diluted. The number of surviving bacteria per ml incubation assay is determined by plate count.

| Diluents: | tryptone water for microorganisms |
|---|---|
| | (0.1 wt. % tryptone (Oxoid), 0.85% NaCl, |
| | deionized. water) deionized water for |
| | DADMAC polymer solutions |
| | inactivating medium for detection of |
| | surviving microorganisms |
| Medium: | casein soybean peptone agar |
| Inactivating Medium: | Tryptic soy broth special |
| | (10% Tween 80, 3% Lecithin, 0.1% L-Histidine, |
| | 0.055% Sodium thiosulfate) |
| Test organisms: | *S. aureus* ATCC 6538 |
| | *E. coli* ATCC 10536 |
| Test concentration: | 100-120 ppm (DADMAC polymer concentration) |
| Contact times: | 5 and 30 minutes at 22° C. |
| Incubation: | 24 h at 37° C. |

The results are shown as log reduction of the initial count in Table 7. All DADMAC polymers tested shows good microbicidal activity against *E. coli* and some activity against *S. aureus*.

TABLE 7

| Polymer | *S. aureus*/ 5 min. | *S. aureus*/ 30 min. | *E. coli*/ 5 min. | *E. coli*/ 30 min. |
|---|---|---|---|---|
| DADMAC/methyl methacrylate (95/5) | 2.9 | 3.6 | >5 | 5 |
| [1]DADMAC/ethoxylated nonylphenol methacrylate (95/5) | 2.1 | 3.7 | >5 | >5 |
| DADMAC/Benzyl methacrylate (95/5) | 1.9 | 3.2 | >5 | >5 |
| DADMAC/Styrene (95/5) | 2.1 | 3.4 | >5 | >5 |
| DADMAC/Methyl methacrylate/Acrylic acid (90/5/5) | | | >5 | >5 |

[1]Prepared as in example 2.

We claim:

1. A surface protectant for hard surfaces and cleaning composition for hard surfaces, which surface protectant and cleaning composition contains 0.01% to 20% polymeric compound formed from the monomeric components consisting of:

(I) 20 to 99.9% by weight of at least one cationic monomer according to formula (I)

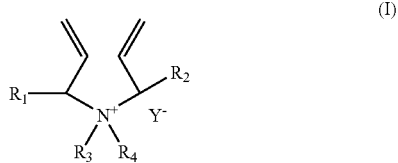

wherein
$R_1$ and $R_2$ are, independently of one another, hydrogen or $C_1$-$C_4$ alkyl;
$R_3$ and $R_4$ are, independently of one another, hydrogen or alkyl, hydroxyalkyl, carboxyl alkyl, carboxyamide alkyl or alkoxyalkyl having from 1 to 18 carbon atoms; and
$Y^-$ represents an anion, and
(II) 0.1 to 80% by weight of at least one hydrophobic unsaturated nonionic monomer that polymerizes in the presence of an initiator selected from the group consisting of monomers represented by formula (B)

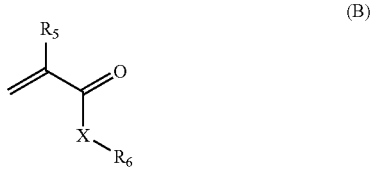

wherein
$R_5$ is H or $CH_3$,
$R_6$ is hexl, heptyl, octyl, isooctyl, 2-ethylhexyl, nonyl, decyl, isodecyl, undecyl dodecyl, lauryl, octadecyl or stearyl, $C_1$-$C_{12}$alkoxy, $C_1$-$C_6$alkylphenyl that may be substituted one to three times by $C_1$-$C_{12}$alkyl or $C_1$-$C_{12}$alkoxy, $C_1$-$C_6$alkylphenyl interrupted one or more times by oxygen wherein the phenyl group may be substituted one to three times by $C_1$-$C_{12}$alkyl, $C_1$-$C_{12}$alkoxy or $C_1$-$C_6$alkoxy; and
X is —O—,
(meth)acrylonitrile and esters of unsaturated polyfunctional acids;
0 to 60% by weight of a water-soluble monomer (III) which is different from monomer (I) or monomer (II) selected from the group consisting of vinyl amine, vinyl alcohol, vinyl derivatives of dimethyl siloxane, vinyl fluorocarbons, aminosiloxanes, hydroxyalkyl acrylates, (meth)acrylic acid and (meth)acrylic acid salts;
and
0 to 10% by weight reactant (IV), a crosslinking agent
and
which composition further comprises an effective amount of one or more surfactants.

2. A composition according to claim 1, wherein at least one cationic monomer (I) is selected from the group consisting of diallyldimethyl ammonium chloride, diallyldimethyl ammonium bromide, diallyldimethyl ammonium sulfates, diallyldimethyl ammonium phosphates, dimethallyl dimethyl ammonium chloride, diethylallyl dimethyl ammonium chloride, diallyl di(beta-hydroxyethyl)ammonium chloride, and diallyl di(beta-ethoxyethyl)ammonium chloride.

3. A composition according to claim 1, wherein at least one of the cationic monomers is diallyldimethyl ammonium chloride.

4. A composition according to claim 1, wherein hydrophobic monomer (II) has a value for water solubility of less than about 50 g/100 g water at room temperature and at a pH of 7.

5. A composition according to claim 4, wherein at least one hydrophobic monomer (II) is selected from the group consisting of (meth)acrylonitrile and esters of unsaturated polyfunctional acids.

6. A composition according to claim 1, wherein hydrophobic monomer (II) is selected from the group consisting of

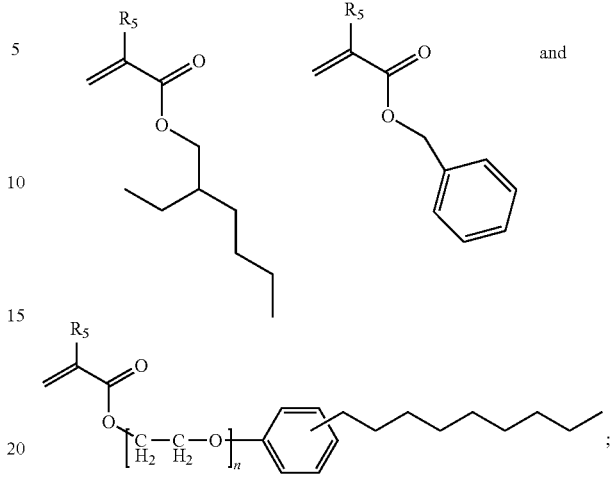

wherein $R_5$ is H or $CH_3$,
and n is a number from 1 to 5.

7. A composition according to claim 1, wherein water-soluble monomer (III) has a value for water solubility greater than 50 g/100 g water at room temperature and at a pH of 7.

8. A composition according to claim 1, wherein the polymeric compound has an average molecular weight in the range of 1000 to 5 million Daltons.

9. A composition according to claim 1, which is in the form of a ready-to-use spray, liquid or paste or is a solid or liquid concentrate which may be diluted with water to arrive at the final cleaning composition.

10. A composition according to claim 1, further comprising at least one additional ingredient which is a perfume, another soil release polymer, colorant, preservative, antimicrobial, optical brightener, ultraviolet light absorber, light management agent, ionization agent, antifoam agent, enzyme, bleaching agent, oxidation catalyst, zeolite, an odor suppressing agent cyclodextrin and derivatives thereof, or a mixture thereof.

11. A reusable or disposable wipe or pad for cleaning or treating a surface, where the wipe or pad has absorbed therein or adsorbed thereto a composition according to claim 1.

12. A method of hard surface cleaning, which comprises contacting said surface with an effective cleaning amount of a cleaning formulation according to claim 1.

13. A method according to claim 12, wherein the surface is ceramic tile, stone, glass, cement, concrete, bricks, plaster, marble; masonry countertops of stone, marble or plastic; and wood, plastic, laminates or floors made of organic or inorganic materials.

14. A method of treating a hard surface whereby resistance to soiling, ease of subsequent soil removal is improved and antimicrobial properties delivered which comprises contacting said hard surface with an effective amount of a composition according to claim 1.

15. A method of antimicrobial treatment of hard surfaces comprising contacting the hard surface with an antimicrobially effective amount of the polymeric compound defined in claim 1.

16. A method of suppressing biolfilm formation on hard surfaces comprising contacting the surface with an effective amount of the polymeric compound defined in claim 1.

17. The composition according to claim 1, wherein monomeric component (I) is 50% to 99% by weight and monomer component (II) is 4 to 20% by weight.

* * * * *